United States Patent [19]

Swift et al.

[11] Patent Number: 5,763,865

[45] Date of Patent: Jun. 9, 1998

[54] READER MODULE FOR READING BAR CODE SYMBOLS WHEN CONNECTED TO OR DISCONNECTED FROM A TERMINAL MODULE

[75] Inventors: Philip W. Swift, Port Jefferson, N.Y.; Alan Ball, Arlington, Mass.; Lee Raymond, Seaford; Joseph DeVita, Patchogue, both of N.Y.

[73] Assignee: Symbol Technologies, Inc., Holtsville, N.Y.

[21] Appl. No.: 625,550

[22] Filed: Apr. 1, 1996

[51] Int. Cl.⁶ .................................................. G06K 7/10
[52] U.S. Cl. ........................ 235/472; 235/454; 235/383
[58] Field of Search ............................... 235/472, 462, 235/454, 383

[56] References Cited

U.S. PATENT DOCUMENTS

| | | | |
|---|---|---|---|
| 5,047,615 | 9/1991 | Fukumoto et al. | 235/472 X |
| 5,055,660 | 10/1991 | Bertagna et al. | 235/472 |
| 5,079,412 | 1/1992 | Sugiyama | 235/472 X |
| 5,117,508 | 6/1992 | Gunter | 2/160 |
| 5,182,441 | 1/1993 | Chadima, Jr. et al. | 235/472 |
| 5,189,291 | 2/1993 | Siemiatkowski | 235/472 |
| 5,227,614 | 7/1993 | Danielson et al. | 235/472 X |
| 5,322,991 | 6/1994 | Hanson | 235/472 |
| 5,349,497 | 9/1994 | Hanson et al. | 361/683 |
| 5,371,348 | 12/1994 | Kumar et al. | 235/472 |
| 5,418,684 | 5/1995 | Koenck et al. | 235/472 X |
| 5,444,462 | 8/1995 | Wambach | 345/158 |
| 5,468,947 | 11/1995 | Danielson et al. | 235/472 |
| 5,468,948 | 11/1995 | Koenck et al. | 235/472 |
| 5,521,370 | 5/1996 | Hanson | 235/472 |
| 5,591,953 | 1/1997 | Rockstein et al. | 235/472 X |
| 5,600,121 | 2/1997 | Kahn et al. | 235/472 |

FOREIGN PATENT DOCUMENTS 1-213763  8/1989  Japan.
2-306385  12/1990  Japan.

*Primary Examiner*—Donald T. Hajec
*Assistant Examiner*—Michael G. Lee
*Attorney, Agent, or Firm*—Kirschstein, et al.

[57] ABSTRACT

An electro-optical system for reading bar code symbols includes a reader module and a terminal module releasably interconnected to each other. The reader module includes a manually actuatable actuator to initiate the reading. Reading is initiated either when the modules are disconnected, or when the modules are interconnected, by manually actuating the actuator in both cases. A keyboard may be provided on either module to facilitate data entry.

17 Claims, 7 Drawing Sheets

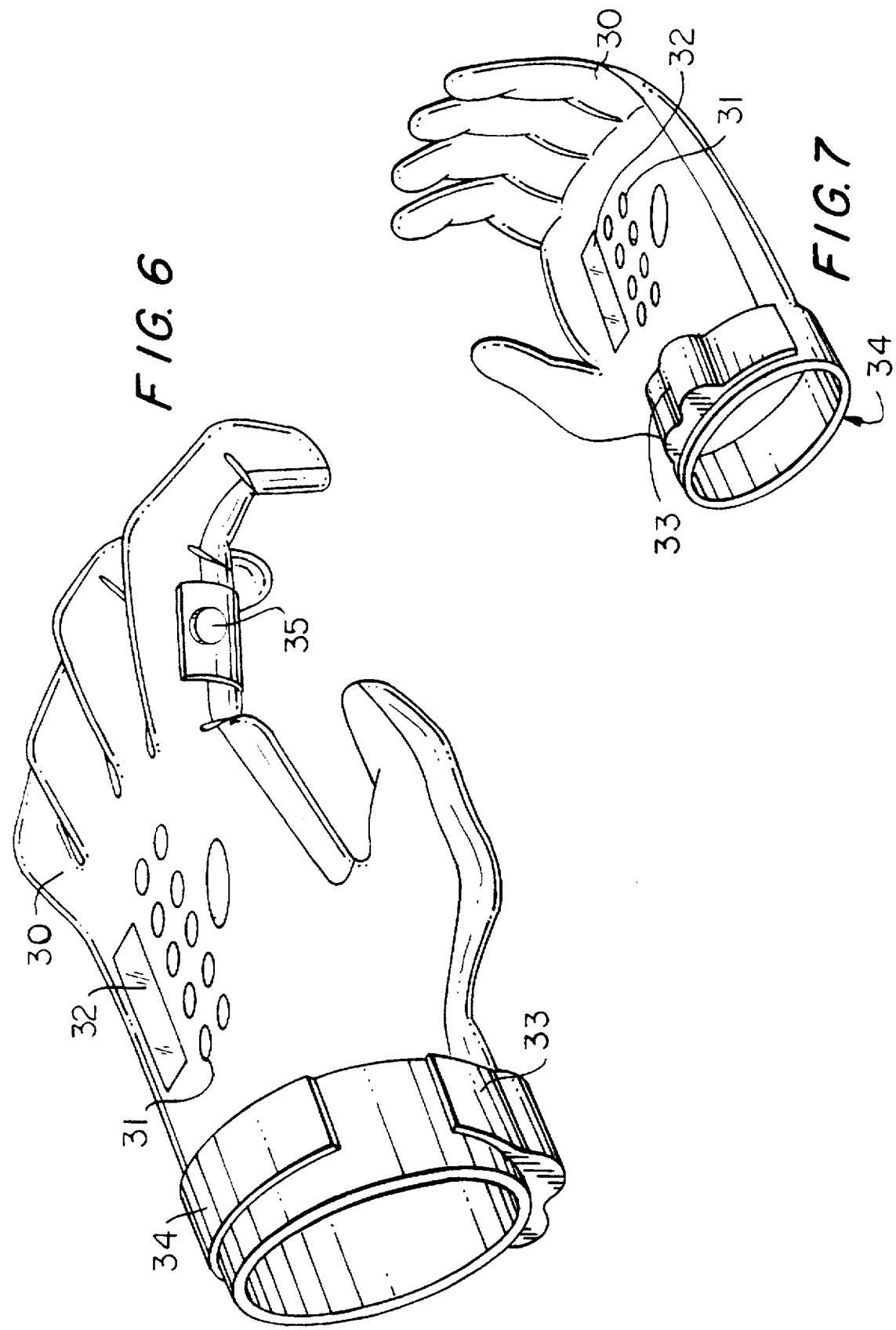

READER MODULE FOR READING BAR CODE SYMBOLS WHEN CONNECTED TO OR DISCONNECTED FROM A TERMINAL MODULE

CROSS REFERENCE TO RELATED APPLICATIONS

This application is related to Ser. No. 08/377,732, filed Jan. 25, 1995, now abandoned and Ser. No. 08/489,729 filed Jun. 13, 1995.

BACKGROUND OF THE INVENTION

1. Field of the Invention

The invention relates to a hand-held optical reader comprising a reader module and a terminal module in particular for reading an indicia such as a bar code symbol.

2. Description of the Related Art

Various readers and optical scanning systems have been developed for reading printed indicia such as bar code symbols appearing on a label or the surface of an article and providing information concerning the article such as the price or nature of the article. The bar code symbol itself is a coded pattern of indicia comprised of, for example, a series of bars of various widths spaced apart from one another to form spaces of various widths, the bars and spaces having different light reflecting characteristics. The readers electro-optically transform the graphic indicia into electrical signals which are decoded into alpha-numeric characters that are intended to be descriptive of the article or a characteristic thereof. Such characters typically are represented in digital form, and utilized as an input to a data processing system for applications in point of sale processing, inventory control and the like.

Known scanning systems comprise a light source for generating a light beam incident on a bar code symbol and a light receiver for receiving the reflected light and decoding the information contained in the bar code symbol accordingly. The readers may comprise a flying spot scanning system wherein the light beam is scanned rapidly across a bar code symbol to be read or a fixed field of view reading system wherein the bar code symbol to be read is illuminated as a whole and a CCD (Charge Coupled Device) array is provided for detecting the light reflected from the bar code symbol. The reader may be either a hand-held device or a surface-mounted fixed terminal.

The information decoded by the reader is down-loaded to a processor which stores and/or processes the information as appropriate. For example where the reader is used at a point of sale price information relating to the product is retrieved. Information relating to the product may also be forwarded to a database for assessing buying patterns and/or demand for the product as well as other applications that will be evident to the skilled man. Similarly in inventorying applications, the data relating to the product must be processed appropriately. Generally at present the reader communicates with the processor via either a cable link or a wireless link.

It is desirable, however, in some cases for the user to be able to access and/or process information from the reader directly. At the same time it is desirable to provide a lightweight, easily held reader without the encumbrance of appropriate intermediate processing circuitry. The user may also wish to have the capability to modify the parameters of operation of the reader via an intermediate processor. For example the user may wish to reconfigure the bar code reader dependent on the bar code symbol standard appearing on products to be read, or change the reading mode from field of view reading mode to flying spot scanning mode.

In addition conventional optical readers require the user to maintain the grip on a handle of the reader or on a portion of the reader throughout the time that the reader is being used which can lead to discomfort to the user in the long term.

Commonly assigned herewith is a European Patent Application having Publication No. 0653722 which relates to an electro-optical system for reading indicia such as bar code symbols including a pivotal scanning head moveable between first and second reading positions and first and second trigger switches to actuate the scanning head dependent on whether it is in its first or second position.

U.S. Pat. No. 5,349,497 relates to a terminal and reader arrangement including a detachable handle which is moveable between various positions.

SUMMARY OF THE INVENTION

Objects of the Invention

It is an object of the present invention to provide an arrangement comprising an improvement over the prior art.

It is a further object to provide a reader allowing the user to access information read by the reader.

It is yet a further object of the invention to provide a reader allowing the user to alter parameters of operation of the reader.

It is a still further object of the invention to provide a reader which can be comfortably used by the user for long periods of time.

It is a further object to provide a reader of improved ergonomic design.

It is a further object to provide a reader having various different gripping modes.

Features of the Present Invention

According to the present invention there is provided an optical reader, comprising:

a reader module including an optical source for generating a reading beam;

an actuator provided on the reader module for actuating the reader module;

a terminal module releasably connectable to the reader module for communicating with the reader module, said terminal module receiving a portion of the reader module.

A detector for detecting the generating beam may be provided in the reader module or in the terminal module.

The reader may further comprise a keypad for user input to the reader. The keypad may be provided on the terminal module or on the reader module.

The reader may further comprise a visual display provided on the terminal module or on the reader module.

The reader may comprise a further main module carrying a keypad, the main module being connectable with the terminal module.

The terminal module may include a recess portion into which a corresponding portion of the reader module is inserted or the terminal module may include a central portion which overlies a corresponding face portion of the reader module and skirt portions overlying portions of adjoining faces of the reader module.

The reader module may be configured to be gripped as a whole in the palm of the hand of a user, rendering the module more comfortable to use over long periods of time.

3

The reader module may comprise a head portion and a handle portion and the terminal module may be connectable to the base end of the handle portion or to the portion of the handle which, in use, faces the user or to the head portion. In each case, the terminal module is connected so as to be simply and comfortably accessed by the user.

According to the invention there is further provided a field of view optical reader, comprising:

a reader module including an optical source for generating a reading beam;

an actuator provided on the reader module for actuating the reader module;

a terminal module releasably connectable to the reader module for communicating with the reader module, said terminal module receiving a portion of the reader module.

According to the present invention there is yet further provided a flying spot optical scanner, comprising:

a scanner module including an optical source for generating a scanning beam;

an actuator provided on the scanner module for actuating the scanner module;

a terminal module releasably connectable to the scanner module for communicating with the scanner module, said terminal module receiving a portion of the scanner module.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 1b is a perspective view of a detail of the reader of FIG. 1a;

FIG. 6 is a perspective view of a glove mounted reader according to the invention;

FIG. 7 is a perspective view of an alternative embodiment of the reader of FIG. 6;

FIG. 9b is a side elevational view of the embodiment of FIG. 9a;

FIG. 9c is a bottom plan view of the embodiment of FIG. 9a;

FIG. 9d is a front elevational view of the embodiment of FIG. 9a;

4

Figure 9A:
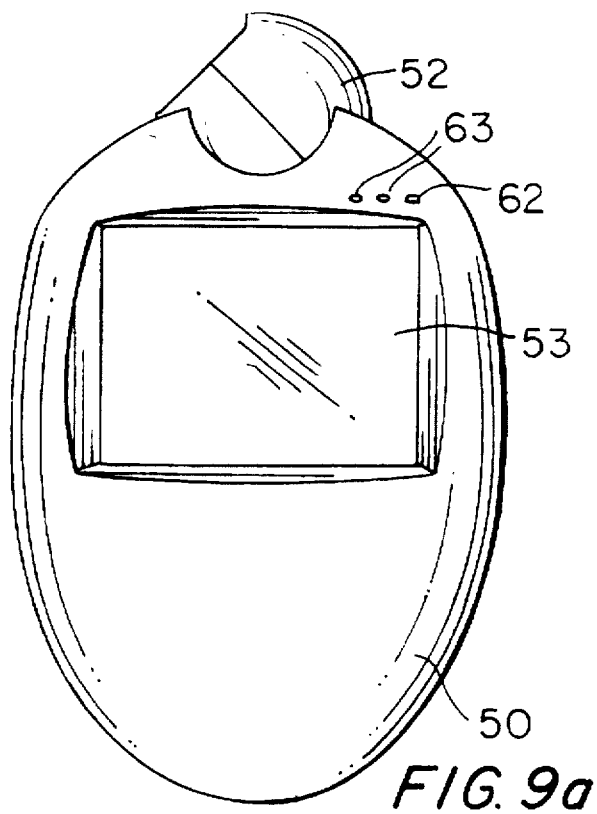
FIG. 9a is a top plan view of an alternative embodiment of the invention.
Figure 9B:
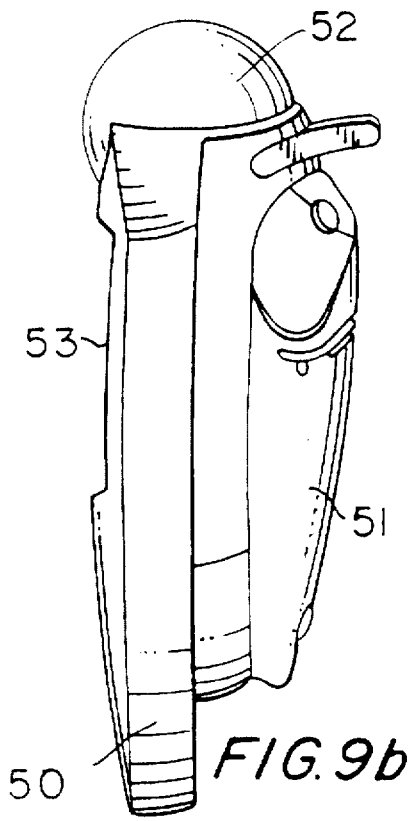
Figure 9C:
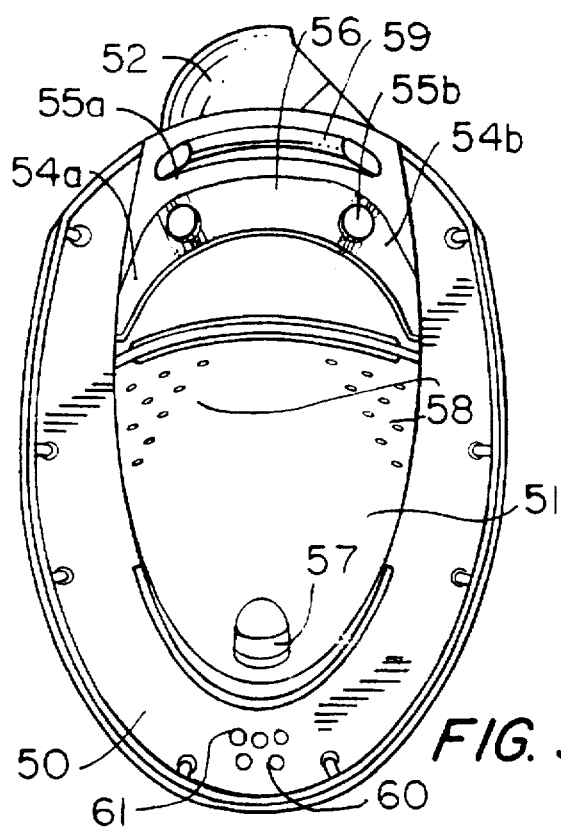
Figure 9E:
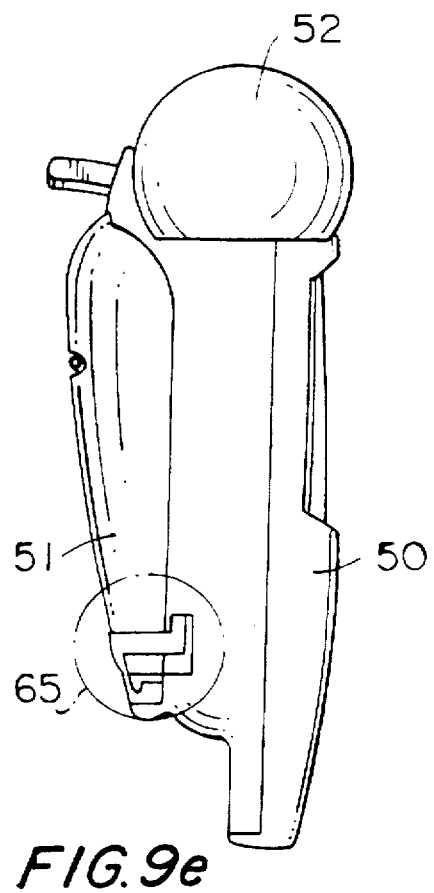
FIG. 9e is a sectional view taken along line A—A of FIG. 9c.
Figure 9D:
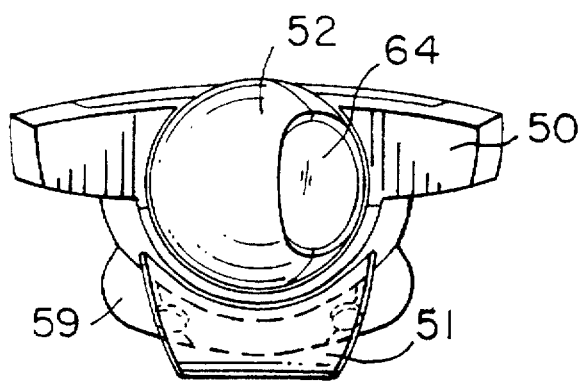
Figure 10C:
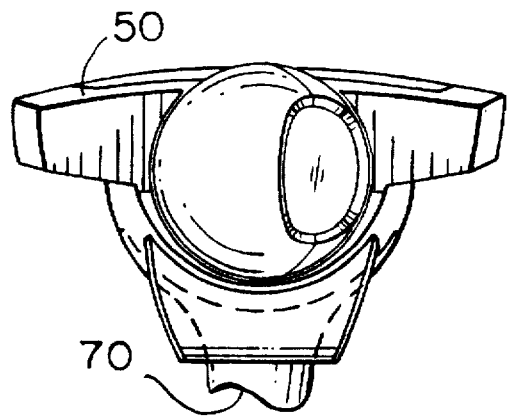
Figure 10A:
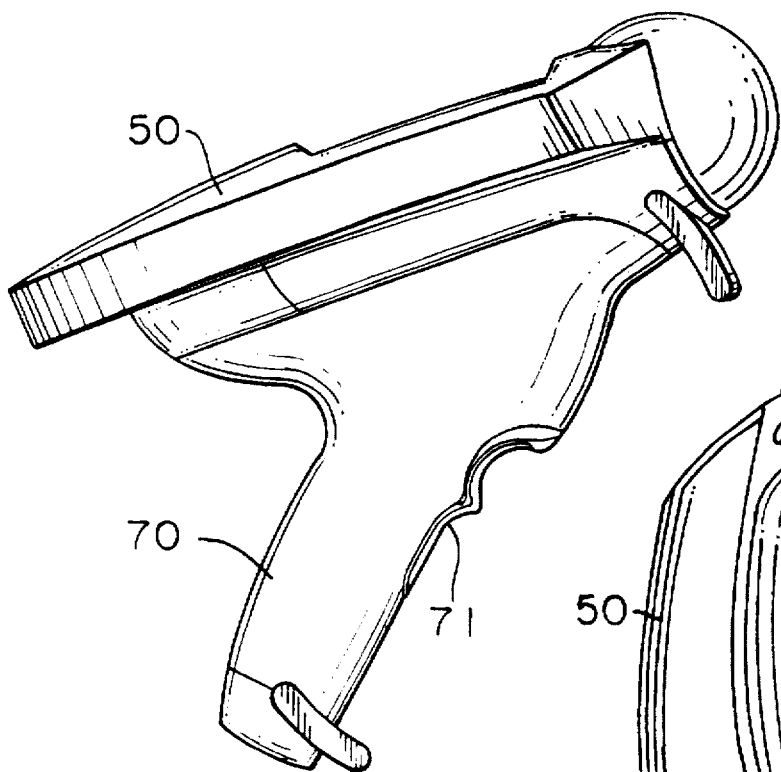
Figure 10B:
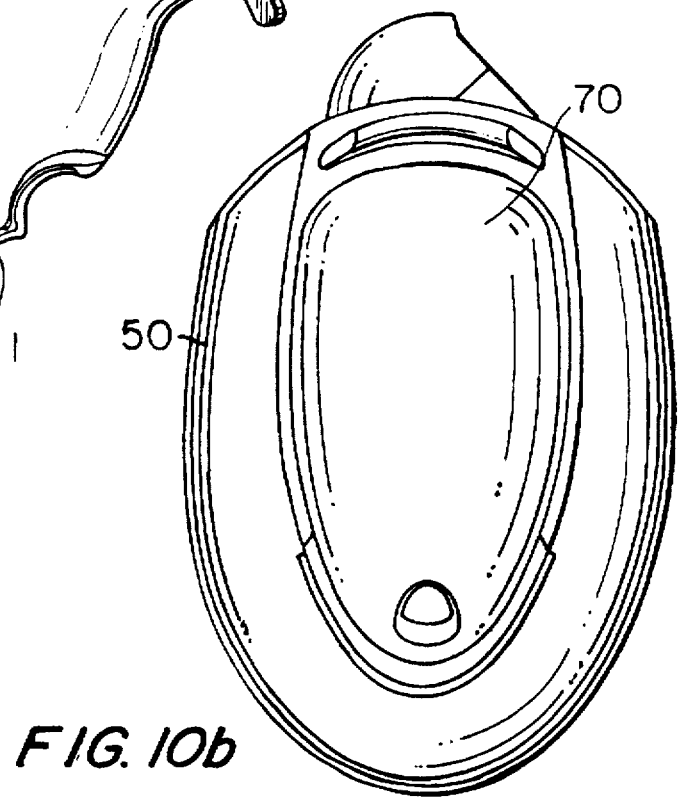

FIG. 10a is a side elevational view of the embodiment of FIGS. 9a to 9e in a different gripping mode arrangement;

FIG. 10b is a bottom plan view of the arrangement shown in FIG. 10a; and

FIG. 10c is a front elevational view of the arrangement shown in FIG. 10a.

DETAILED DESCRIPTION OF THE PREFERRED EMBODIMENTS

Figure 8:
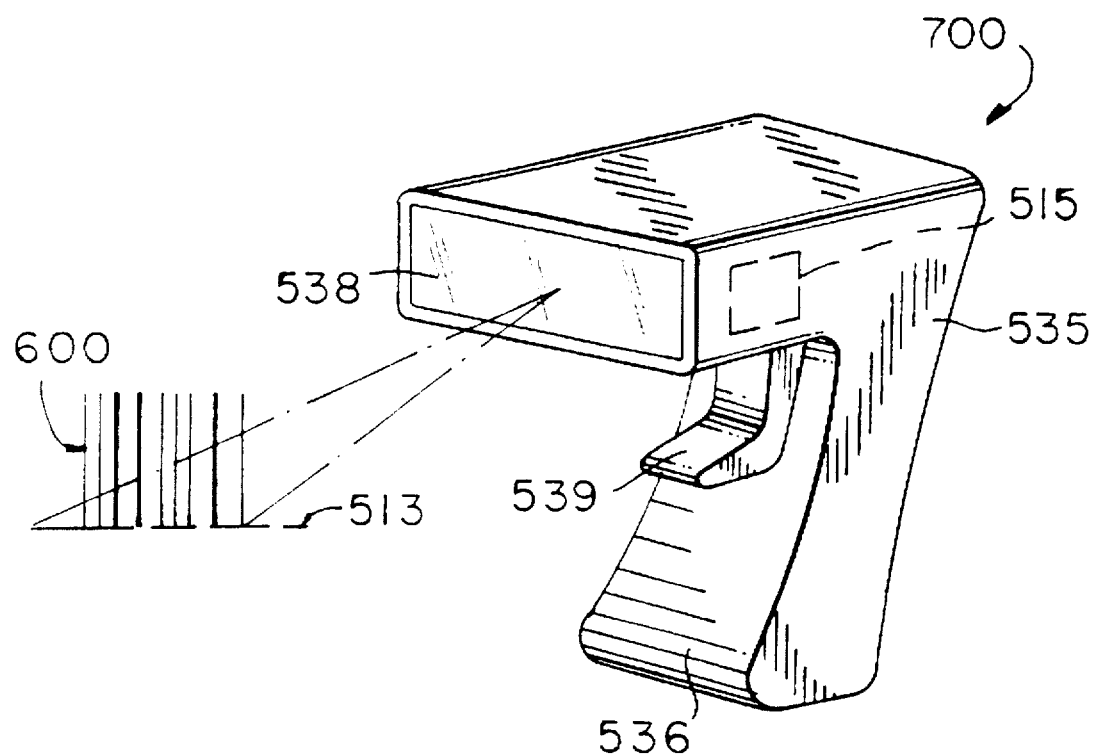
FIG. 8 is a perspective view of a conventional bar code reader according to the prior art.

FIG. 8 illustrates a typical bar code reader according to the prior art. The reader comprises a hand-held laser scanner, generally indicated at 700, having a main body 535 including a graspable hand portion 536 which carries a trigger 539. Within the body 535 is a laser module 515 (not shown in detail). Light from the laser module 515 is arranged to shine onto an oscillating mirror provided in the body 535. The resultant reflected beam passes through a lens, and out of the housing via a window 538. The mirror is arranged to oscillate in such a way that the beam traces out a scan line 513 across a bar code 600 to be read. In the example shown in FIG. 8, the bar code 600 is a linear bar code, but it will of course be appreciated that the scanner could instead be arranged to read two-dimensional bar codes: in such a case the mirror would be controlled to produce a raster scan rather than a single line scan. Rather than using an oscillating mirror, the laser module itself could be oscillated to form the scan line 513.

Light reflected back from the bar code 600 passes through the window 538 and is collected by a collecting mirror, from where it is reflected back to a photodetector. The optical signal is then converted into an electrical signal, and the features of the bar code symbol 600 determined.

Figure 1A:
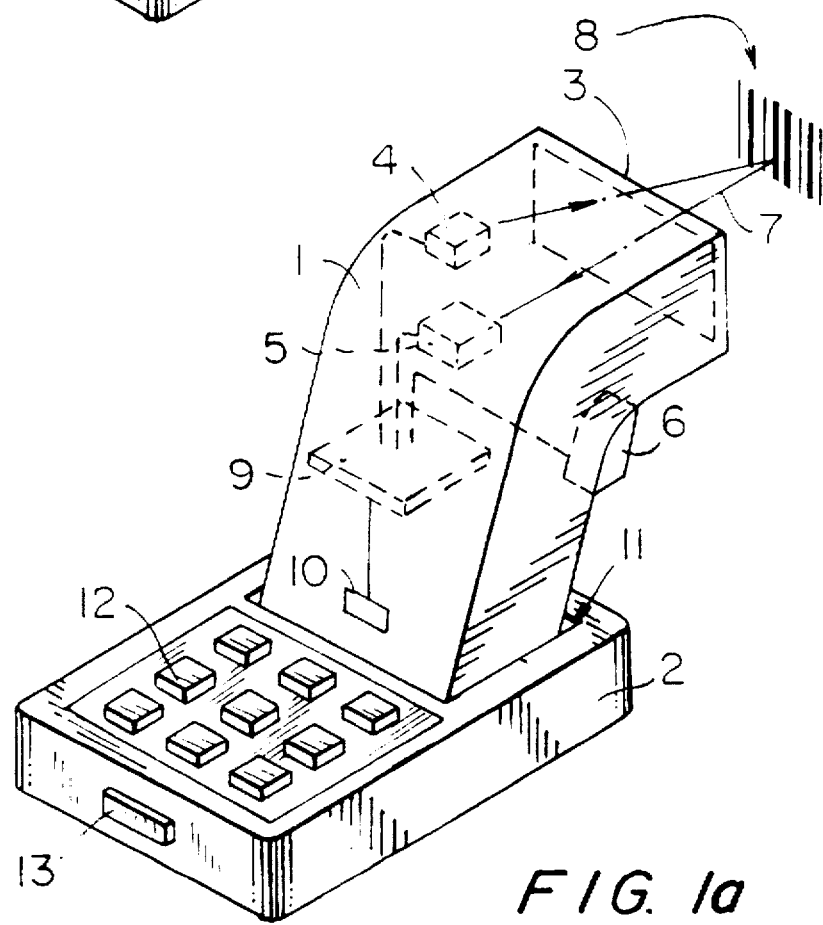
FIG. 1a is a perspective view of a first embodiment of an optical reader according to the present invention.

Considering now the embodiment according to this invention shown in FIG. 1a, there is shown a hand-held optical reader including a reader module 1 and a terminal module 2. The reader module includes a reading window 3, a reading beam source 4 and a detector 5 (all shown generally internal to the reader module). The reader is actuated by a trigger 6 causing the source 4 to generate a beam 7 which is transmitted through the window 3, impinges on a bar code symbol 8 and is reflected back through window 3 and detected by detector 5. The scanner may include a preliminary processing means which controls operation of the beam source 4 and detector 5 on actuation of the trigger 6 and preprocesses information from the detector 5. The preprocessing unit is shown generally as 9 within the module housing. The processor is connected to an interface shown generally as 10 for down-loading information to an external processor and/or receiving information from such an external processor.

Figure 1B:
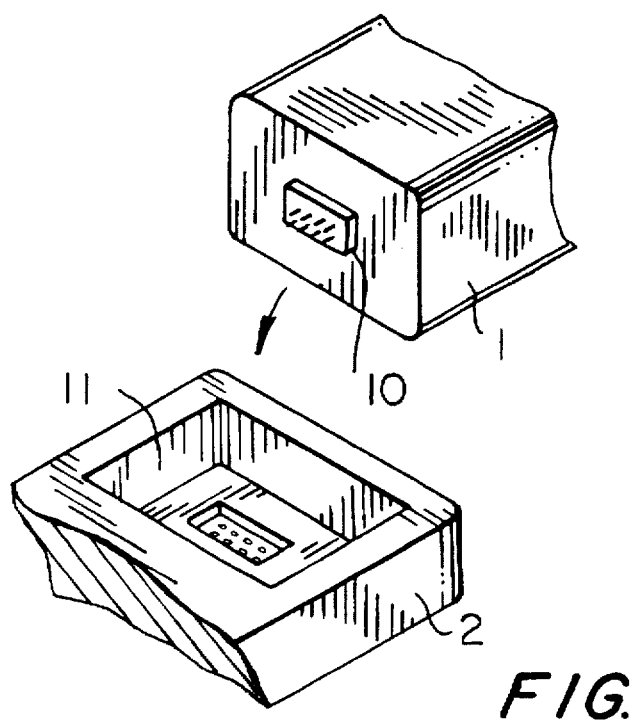

In prior art arrangements the interface 10 has comprised either a connector to a physical cable to an external processor or a wireless communication link using infrared, radio frequency or other means of wireless communication. Such an arrangement is inconvenient or inappropriate, however, where the user wishes to access information received from the reader or modify operation of the reader. Accordingly, in the present invention, a terminal module 2 is provided. The interface 10 of module 1 comprises a pin-type or other suitable type connector provided on an outer surface of the module 1. A pin-type interface is shown in FIG. 1b. A corresponding connector is provided on the terminal module 2 such that when the reader module 1 and terminal module 2 are connected an interface is formed allowing the communication of information between the modules.

It is desirable for the reader module to be as lightweight and simple as possible and hence the shape of the terminal module 2 is configured appropriately to interconnect on, around or with the module 1 such that the shape of the module 1 is affected as little as possible. In fact other than the pins at the interface 10, the shape of the reader module 1 may be configured solely with the comfort and convenience of the user in mind. The primary purpose of the apparatus as a reader is thus not affected, and when the terminal is not attached optimum use of the reader module itself can be achieved.

In the embodiment shown the terminal module 2 includes a recess 11 into which the lower portion of the reader module 1 is inserted. The interface pins on the terminal module 2 are provided at an appropriate location in the recess 11 for connection with the interface 10 of the reader module 1. As will be seen, by virtue of the positioning of the terminal at the base of the arrangement the terminal may be easily operated by the user while still holding the reader module 1 in an operation position. Suitable gripping means can be provided on the terminal module 2 for holding the reader module in place, for example a resilient rubber sleeve or suitable detent means. It will be seen that, once again, the shape of the reader module 1 itself is affected as little as possible.

The terminal module 2 includes a keypad 12 allowing the user to enter information into the reader module 1 to alter its mode of operation. The keypad may also be used to retrieve or access information processed by the reader module 1. A display is preferably provided on the terminal module 2 to assist the user in selecting various options, reviewing information and so forth. The display can be, for example, an LCD display provided on the terminal module either above or below the keypad 12. The display is not shown in FIG. 1a. Alternatively the display could be provided on the reader module 1, for example on the rear face facing the user, allowing the user to view the display with minimum difficulty.

An interface designated generally as 13 is provided on the terminal module 2 allowing communication of the terminal module 2 with a host processor either by a physical or cable link or by wireless communication in a similar manner to interface 10 discussed above. It will be appreciated that the terminal module 2 will include suitable processing means for processing information to and from the reader module 1.

Figure 2:
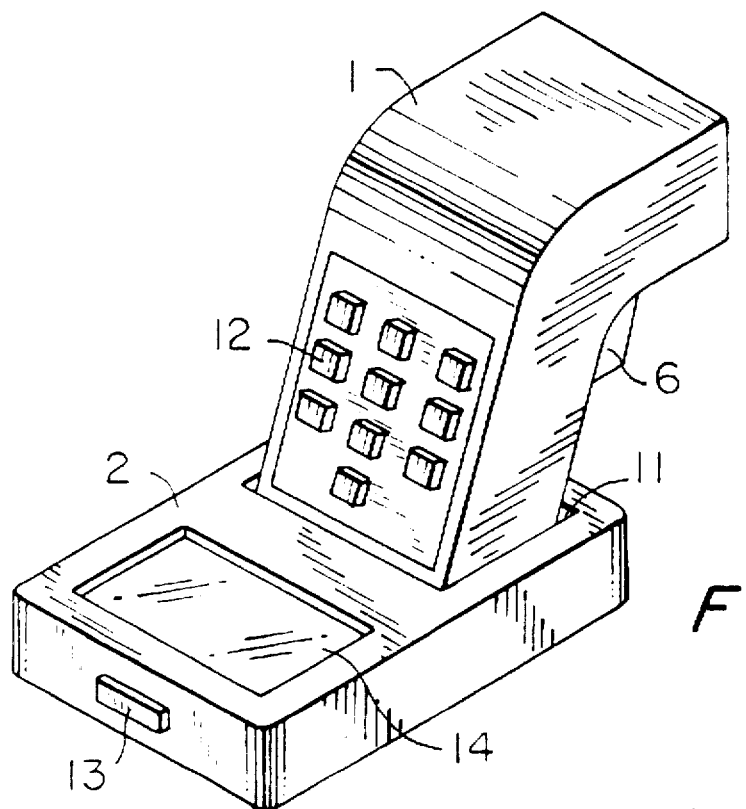
FIG. 2 is a perspective view of a second embodiment of the invention.

Referring now to FIG. 2 a reader module 1 is inserted into a recess 11 of a terminal module 2 as discussed in FIG. 1a. Like reference numerals designate like parts. In the embodiment shown in FIG. 2, however, the distribution of various elements has been altered. In particular the keypad 12 is found on the handle portion of the reader module itself, on the rear face to allow improved access by the user. In addition a display 14 is provided on an upper surface of the terminal module 2. Communication between the various parts is carried by the interface between the modules. By using the surface of the reader module 1 in this manner a more compact terminal module can be arrived at rendering the combined system as a whole yet more compact and attractive to the user.

Figure 3:
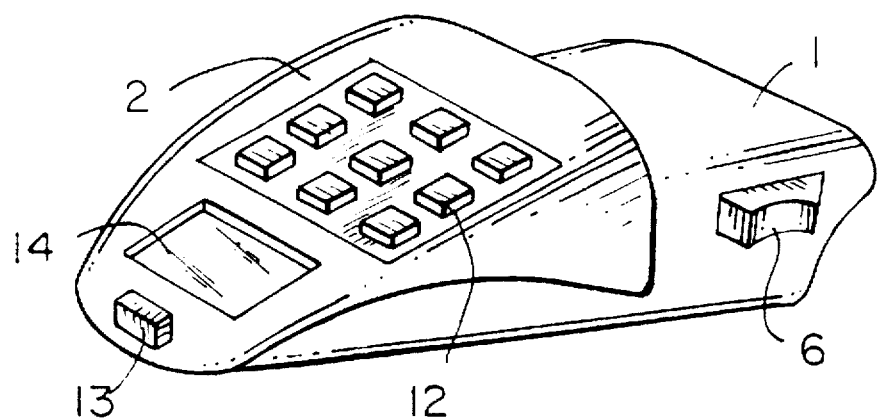
FIG. 3 is a perspective view of a third embodiment of the invention.

The reader module 1 shown in FIG. 3 is of a different configuration to that shown in FIGS. 1a and 2. In particular the reader module 1 does not include a handle portion but is designed such that the module 1 as a whole is gripped in the palm of the hand of the user. A trigger 6 is provided for actuation by the user's thumb. A more compact and ergonomically desirable reader is thus provided. The terminal module 2 is then shaped as a "shield" fitting over an upper portion of the reader module 1 and connecting with a suitably positioned interface 10 of the module 1 (not shown) in the manner discussed above. Once again, therefore, the shape of the reader module 1 itself is substantially unaffected allowing its design to be arrived at solely on the basis of comfort and convenience for the user in its principal operation as an optical reader. In addition, because of the corresponding shape of the terminal module 2, which is designed to overlie the upper rear portion of the module 1 with skirt portions of the terminal module 2 wrapping around side portions of the module 1, the ergonomic features of the system as a whole are retained. In particular the terminal module 2 includes on its upper face a keyboard 12 and a display 14 which are easily accessed by the user with the other hand not gripping the system as a whole.

Figure 4:
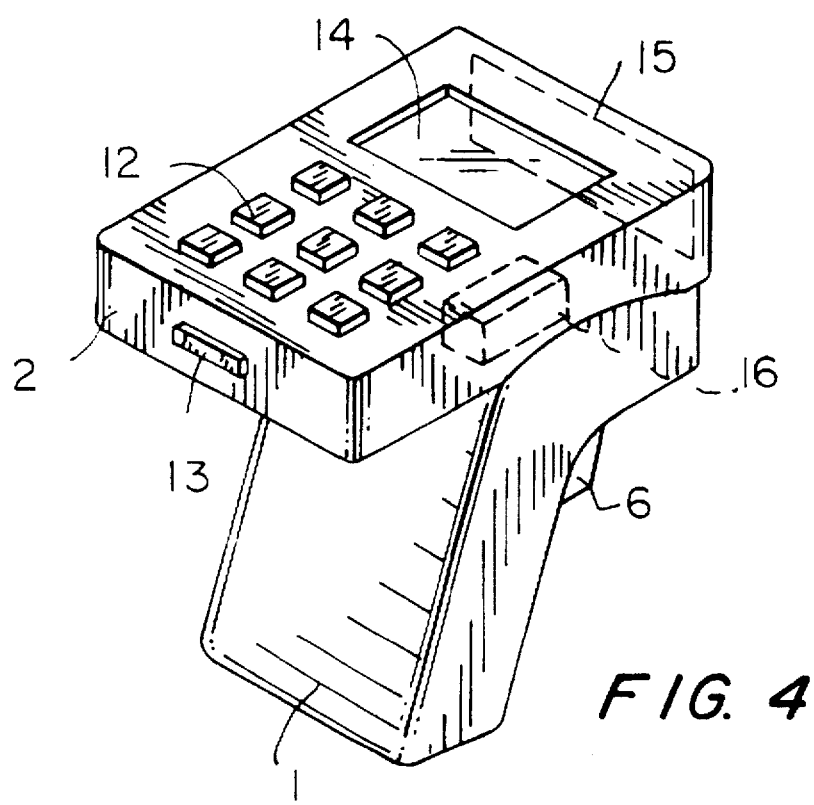
FIG. 4 is a perspective view of a fourth embodiment of the invention.

In FIG. 4 yet a further alternative is shown. In this case the terminal module 2 is mounted on an upper portion of the reader module 1. The terminal module may, for example, overlie the upper portion of the reader module 1 and partially encapsulate the reader module 1, such that once again the shape of the reader module 1 need not be designed with interfacing needs in mind. It can be seen that user access to the keyboard 12 and display screen 14 are optimized for comfort and convenience by locating those elements on the upper face of the terminal module 2. In one embodiment the light beam generating source and window are provided in the reader module 1 and a further window 15 and detector 16 are provided in the terminal module, thus reducing the amount of circuitry and components required in the reader module.

Figure 5:
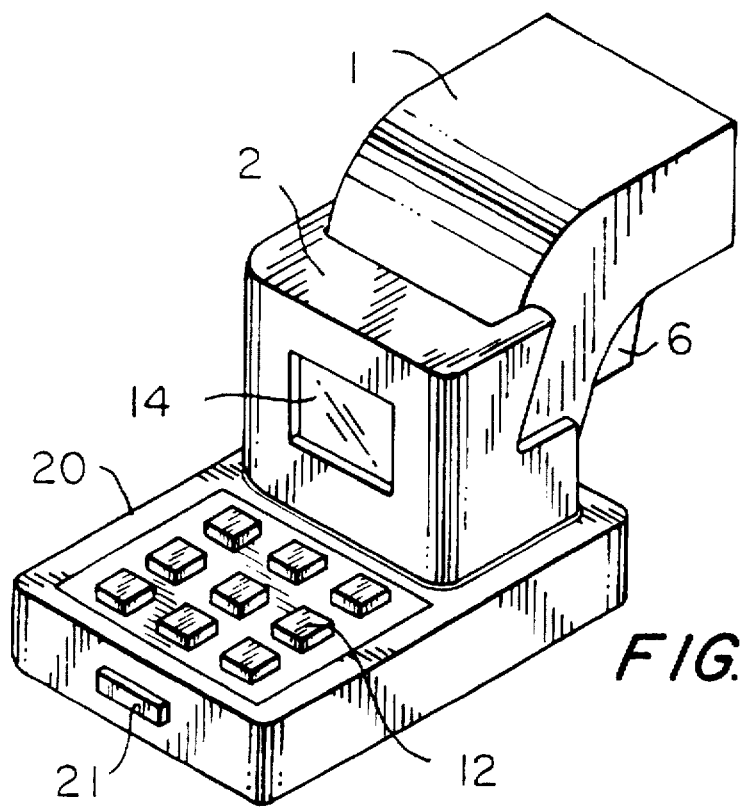
FIG. 5 is a perspective view of a fifth embodiment of the invention.

The further alternative embodiment shown in FIG. 5 includes a reader module 1 inserted in the manner discussed above into terminal module 2 which includes an intermediate processor means. The terminal module 2 further includes a display screen 14 allowing the user to view information retrieved from the reader module 1. The reader module 1 and terminal module 2 are further insertable into a main module 20 via an interface component in the terminal module and corresponding connector in the main module 20 which interacts in much the same manner as the interface between modules 1 and 2. The main module 20 includes a keypad 12 allowing the user to input or retrieve information as appropriate. The main module 20 further includes an interface 21 for connection with a host terminal via a physical wired link or wireless communication. Alternatively the module 20 can comprise an integral part of a host processor.

It will be appreciated that features of the embodiments discussed above can be interchanged as appropriate to obtain variations and modifications not explicitly described herein.

In another aspect the invention relates to an optical reader which is worn on the hand of a user, thus allowing the user great mobility and removing the need for the user to grip the bar code reader at all times. In particular, as shown in FIGS. 6 and 7, the reader can be provided in a glove 30 to be worn by the user. The glove 30 includes a keypad 31 and a display 32 allowing the user to input and retrieve information from the reader. The glove further includes a flexible battery element 33 mounted around the wrist portion and a flexible film circuit computer 34 also mounted around the wrist portion. Of course those components may be provided elsewhere in the glove. Wiring between the various components can pass within the fabric of the glove itself.

The glove further includes a reader actuator 35 provided on the forefinger of the glove allowing a simple actuation by the user with the user's thumb. In a first arrangement, the scanner and receiver can be provided in an appropriate portion of the glove, for example at the knuckle portions or in the finger end portions allowing the user to simply direct his hand, or point his finger towards a symbol to be read. The reader is then actuated by operating the thumb actuator 35. Information from the reader can be down-loaded to a host processor using any suitable interface, intermediate processing and reviewing of the information being carried out using the keypad 31 and display 32.

In an alternative embodiment the glove corresponds to the terminal module described in relation to the preceding figures and a suitable interface is provided on the glove for connection with a corresponding interface on a separate reader module. In that case the keypad 31 and the display 32 can be easily and efficiently manipulated by one hand of the user while the reader module is held in the other, glove-bearing hand. The design is thus yet further ergonomically improved while minimal alterations or compromises of the shape of the reader module are required.

In a further alternative embodiment shown in FIG. 7 in which like reference numerals designate like parts the keypad 31 and the display 32 are provided on the palm of the glove rather than the back of the glove as shown in FIG. 6.

It will be appreciated that the readers discussed above can be either field of view or flying spot readers and can be configured to optically read any appropriate indicia including bar code symbols.

According to a further aspect of the invention a two-piece optical reader comprises, as shown in FIGS. 9a to 9e a reader portion 50 and a palm grip portion 51. The reader portion 50 includes a "fish eye", scan head 52 which is rotatable from the position shown in FIG. 9a pointing substantially leftwards as viewed on the page to the complementary position pointing substantially rightwards as viewed on the page. The reader portion 50 further includes a display screen such as an LCD screen 53 for displaying options and/or information as discussed above. The display screen 53 can be a touch-sensitive screen for the input of information and instructions or a separate keypad (not shown) may be provided. The reader as a whole is designed to be held in the palm of the user's hand, as discussed in more detail below, the display screen 53 is located on an upper face of the reader portion 50 so that the user can view the screen instantly when holding the reader in the user's palm, and the scanning head 52 is provided at the forward end so as to point outwards and away from the user when the reader is held in the user's palm.

When viewed from above the upper face of the reader portion 50 is of substantially oval profile so as to fit comfortably in the user's palm. The front end portion, in the vicinity of the scan head 52 is reduced to a circle segment shape giving the reader portion 50 profile as a whole an egg shape.

Referring now to FIG. 9b the spherical nature of the fish eye scanner head can be clearly seen. The front end face from which the scanner head 52 projects and the upper face, when viewed from the side are substantially square and the reader portion 50 as a whole is substantially L-shaped with the longer limb running parallel to the upper face and having a stepped profile towards the rear end of the upper face. The palm grip portion 51 is attached to the reader portion 50, fitting against the base of the reader portion 50 so as to complement the L-shaped profile. The palm grip portion 51 is slightly bulbous so as to fit yet more comfortably in the user's palm.

As can best be seen in FIG. 9c the underside of the reader includes various operating/actuating elements provided both on the palm grip portion 51 and on the reader portion 50. In particular a pair of triggers 54a, 54b are provided at the frontward portion of the palm grip portion 51. Accordingly the reader can be used in either hand of the user simply by ensuring that the scanning head 52 is pointed in an appropriate direction, in which case the appropriate trigger, either 54a or 54b can be used. The palm grip portion further includes optional features such as cursor buttons 55a, 55b (also positioned by the side of the palm grip portion for use in either hand by the user) for controlling parameters of the display, for example, and a mouse key 56 provided between the trigger and cursor buttons. The palm grip portion 51 further includes a strap slot 57 into which a strap can be inserted for wrapping around a user's wrist for added security. The palm grip portion further includes textured grip portions 58 for improving the user's hold. The palm grip portion may be formed partially of, or include a cover of moulded rubber or other material suitable for comfortable and long-term gripping by the user.

Provided on the lower face of the reader portion is a stabilizing rib and power contacts 60 allowing connection with a external power source or a recharger for an internal power source. There is further provided an interface means such as an infrared transfer 61 for communication with an external terminal.

In addition a speaker hole can be provided allowing the user to issue vocal commands. The speaker hole may be, for example, provided on the upper face of the reader portion 62. Status indicators such as LED's can be provided to indicate the operational status of the reader, battery status and so forth at 63 on the upper face. Additional front face buttons can also be provided on the upper face or elsewhere for allowing control of various options, for example transfer of the reader from left handed to right handed configuration. Front face buttons may be provided, for example, below the display screen on the upper face and may be provided symmetrically for left handed or right handed use. The front face buttons are not shown in the drawings.

FIG. 9d shows a view of the reader from the front in which the scanner head lens 64 can be viewed.

FIG. 9e is a cross-sectional view taken along line A-A of FIG. 9c, along the central longitudinal axis of the reader. As can be seen a latch mechanism 65 is shown for releasably attaching the palm grip portion 51 to the reader portion 50. The latch mechanism may be any suitable known type of latch mechanism, for example a resilient detent type mechanism.

FIGS. 10a to 10c show the reader of FIGS. 9a to 9e in an alternative gripping mode or configuration. The palm grip portion 51 has been removed by a suitable operation of the latch mechanism 65 and replaced by a handle portion 70. The handle portion 70 latches onto the reader portion 50 by means of a latching engagement identical to the palm grip portion latching mechanism 65 discussed above so that the gripping portions are immediately interchangeable.

The reader portion 50 is identical to that discussed in relation to FIGS. 9a to 9e and includes all of the same features. The handle portion projects downwardly at an obtuse angle to the reader portion 50 such that it may be comfortably gripped with the user's hand wrapped around it so as to facilitate aiming of the reader. The handle portion includes a trigger 71 suitably positioned for actuation by the user's fore-finger or other fingers.

Accordingly a single reader portion can be adapted for whatever mode of use is desired by the user—either palm-held use or handle-held use simply by attachment of the appropriate gripping portion. Such an arrangement is of particular benefit when the reader is intended for use in various different applications. For example when the reader is to be used in relation to easily accessible bar code symbols on items, the handle portion 70 can be attached and the user can simply point the reader in the gun-type gripping mode at the bar code symbols to be read. On the other hand, in some circumstances the bar code symbols will be positioned so as to be not easily accessible, such as when an inventorying operation is taking place in a warehouse. In that case the palm-held gripping mode can be adopted allowing the user more flexibility. Of course further types of gripping portion may be attached to the reader portion, dependent on the desired application.

Because of the configuration of the reader portion 50 further accessories may be mounted as appropriate. For example a light pen may be releasably attachable to the reader portion. The light pen may either lie alongside the display on the flat upper face of the reader portion or may be of curved profile and shaped to be mounted along a curved side of the reader portion.

Without further analysis, the foregoing will so fully reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

We claim:

1. An optical reader, comprising:

a reader module including an optical source for generating a reading beam;

an actuator provided on the reader module for actuating the reader module;

a terminal module releasably connectable to the reader module for communicating with the reader module, said terminal module receiving a portion of the reader module; and a detector provided on the terminal module for detecting the reading beam.

2. A reader as claimed in claim 1 in which a detector for detecting the reading beam is provided in the reader module.

3. A reader as claimed in claim 1 further comprising a keypad for user input to the reader.

4. A reader as claimed in claim 3 in which the keypad is provided on the terminal module.

5. A reader as claimed in claim 3 in which the keypad is provided on the reader module.

6. A reader as claimed in claim 1 further comprising a visual display.

7. A reader as claimed in claim 6 in which the display is provided on the terminal module.

8. A reader as claimed in claim 6 in which the display is provided on the reader module.

9. A reader as claimed in claim 1 further comprising a main module carrying a keypad, the main module being connectable with the terminal module.

10. A reader as claimed in claim 1 in which the terminal module includes a recess portion into which the portion of the reader module is inserted.

11. A reader as claimed in claim 1 in which the terminal module includes a central portion which overlies a corresponding face portion of the reader module and skirt portions overlying portions of adjoining faces of the reader module.

12. A reader as claimed in claim 1 in which the reader module is configured to be gripped as a whole in the palm of the hand of a user.

13. A reader as claimed in claim 1 in which the reader module comprises a head portion and a handle portion and the terminal module is connectable to a base end of the handle portion.

14. A reader as claimed in claim 1 in which the reader module comprises a head portion and a handle portion and the terminal module is connectable to a part of the handle portion which, in use, faces the user.

15. A reader as claimed in claim 1 in which the reader module includes a head portion and a handle portion and the terminal module is connectable to the head portion.

16. A field of view optical reader, comprising:

a reader module including an optical source for generating a reading beam;

an actuator provided on the reader module for actuating the reader module;

a terminal module releasably connectable to the reader module for communicating with the reader module, said terminal module receiving a portion of the reader module; and a detector provided on the terminal module for detecting the reading beam.

17. A flying spot optical scanner, comprising:

a scanner module including an optical source for generating a scanning beam;

an actuator provided on the scanner module for actuating the reader module;

a terminal module releasably connectable to the reader module for communicating with the reader module, said terminal module receiving a portion of the reader module; and a detector provided on the terminal module for detecting the reading beam.

* * * * *